United States Patent
Saitoh et al.

(10) Patent No.: US 10,203,562 B2
(45) Date of Patent: Feb. 12, 2019

(54) LIQUID CRYSTAL DISPLAY DEVICE

(71) Applicant: SHARP KABUSHIKI KAISHA, Sakai, Osaka (JP)

(72) Inventors: Kaori Saitoh, Sakai (JP); Yasuyoshi Kaise, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/555,769

(22) PCT Filed: Mar. 3, 2016

(86) PCT No.: PCT/JP2016/056660
§ 371 (c)(1),
(2) Date: Sep. 5, 2017

(87) PCT Pub. No.: WO2016/143674
PCT Pub. Date: Sep. 15, 2016

(65) Prior Publication Data
US 2018/0039120 A1 Feb. 8, 2018

(30) Foreign Application Priority Data
Mar. 6, 2015 (JP) .................. 2015-045182

(51) Int. Cl.
*G02F 1/1339* (2006.01)
*G02F 1/1335* (2006.01)
(Continued)

(52) U.S. Cl.
CPC ........ *G02F 1/13394* (2013.01); *G02F 1/1368* (2013.01); *G02F 1/133512* (2013.01);
(Continued)

(58) Field of Classification Search
CPC ........... G02F 1/13394; G02F 1/133512; G02F 1/133514; G02F 1/134336;
(Continued)

(56) References Cited

U.S. PATENT DOCUMENTS

2007/0200994 A1 8/2007 Yanagisawa
2015/0261050 A1* 9/2015 Chen ................. G02F 1/134336
349/42

FOREIGN PATENT DOCUMENTS

JP 2007-232820 A 9/2007
JP 2010210676 A * 9/2010

* cited by examiner

*Primary Examiner* — Nathanael R Briggs
(74) *Attorney, Agent, or Firm* — ScienBiziP, P.C.

(57) ABSTRACT

A liquid crystal display device according to one aspect of the present invention includes: a liquid crystal layer sandwiched between an element substrate and an opposing substrate; a plurality of spacers; and a Hack matrix provided on a surface on the element substrate side of the opposing substrate and having a first portion that extends in a row direction to separate a plurality of subpixels arranged in a column direction and a second portion that extends in the column direction to separate a plurality of subpixels arranged in the row direction, are included. The first portion is formed by alternately disposing first regions and second regions having a narrower area than the first regions every two subpixels arranged in the row direction. The spacer is disposed in any of the first regions. The spacer in disposed in the first regions. Spacers arranged in odd-numbered rows and spacers arranged in even-numbered rows do not adjoin each other in the column direction.

12 Claims, 20 Drawing Sheets

(51) Int. Cl.
 *G02F 1/1343* (2006.01)
 *G02F 1/1368* (2006.01)
(52) U.S. Cl.
 CPC .. *G02F 1/133514* (2013.01); *G02F 1/134336*
  (2013.01); *G02F 1/134363* (2013.01); *G02F*
  *2001/13396* (2013.01); *G02F 2001/134345*
  (2013.01); *G02F 2201/123* (2013.01)
(58) Field of Classification Search
 CPC ............ G02F 1/134363; G02F 1/1368; G02F
  2001/13396; G02F 2001/134345; G02F
  2201/123
 See application file for complete search history.

LIQUID CRYSTAL DISPLAY DEVICE

TECHNICAL FIELD

The present invention relates to a liquid crystal display device.

Priority is claimed on Japanese Patent Application No. 2015-045182, filed Mar. 6, 2015, the content of which is incorporated herein by reference.

BACKGROUND ART

Conventionally, in liquid crystal display devices, a spacer, which separates a pair of substrates by a predetermined gap, is provided on a surface of the substrate on a liquid crystal layer side. For example, the spacer is formed directly on the substrate using a photosensitive resin or the like. An alignment film is formed on the substrate on which spacers are formed on opposing surfaces of the substrate, and a rubbing treatment is performed thereon. A configuration of a liquid crystal display device including such spacers is described in Patent Literature 1.

Because the spacers described in Patent Literature 1 are formed before a rubbing treatment, a rubbing failure may occur on a downstream side in a rubbing direction of the spacer during the rubbing treatment. Thus, a density of the spacers is reduced, and the occurrence of an alignment failure due to such a rubbing failure is minimized. In Patent Literature 1, spacers are arranged at a ratio of one spacer or less per pixel in a direction in which subpixels of different colors are arranged and one spacer is disposed at least every three pixels or four pixels.

However, the spacers are not arranged continuously every three pixels or four pixels or more at most.

PRIOR ART DOCUMENT

Patent Document

[Patent Document 1] Japanese Patent Application Publication No. 2007-232820

SUMMARY OF THE INVENTION

Problem to be Solved by the Invention

In a configuration in which one spacer is arranged for each of a plurality of pixels, for example, the spacer may be extended across subpixels of different colors to secure a retention strength of a cell thickness.

In this case, because a dimension (a lateral width) in an extending direction of the spacer is lengthened, it is difficult to remove a foreign object such as dust caught by the spacer during a cleaning process of a substrate surface performed after the spacer is formed. When a foreign object is present on the substrate, an alignment disorder of a liquid crystal occurs, causing a problem in that minute luminescent spots occur.

According to an aspect of the present invention, an objective of the present invention is to provide a liquid crystal display device such that it becomes difficult for a foreign object to remain during cleaning and it becomes possible to sufficiently secure a retention strength of a liquid crystal cell thickness.

Means for Solving the Problems

A liquid crystal display device according to one aspect of the present invention includes: an element substrate; an opposing substrate opposite the element substrate; a liquid crystal layer sandwiched between the element substrate and the opposing substrate; a plurality of spacers disposed between the element substrate and the opposing substrate; and a black matrix provided on a surface on the element substrate side of the opposing substrate and having a first portion that extends in a row direction to separate a plurality of subpixels arranged in a column direction and a second portion that extends in the column direction to separate a plurality of subpixels arranged in the row direction, wherein the first portion is formed by alternately disposing first regions and second regions having a narrower area than the first regions every two subpixels arranged in the row direction, the spacer is disposed in any of the first regions, and spacers arranged in odd-numbered rows and spacers arranged in even-numbered rows do not adjoin each other in the column direction.

In the liquid crystal display device according to one aspect of the present invention, the configuration may be that the plurality of spacers include: main spacers in contact with both the element substrate and the opposing substrate; and subspacers in contact with either of the element substrate and the opposing substrate.

In the liquid crystal display device according to one aspect of the present invention, the configuration may be that the subspacers have a lower height than the main spacers and are provided on a surface of the element substrate side of the opposing substrate so that the liquid crystal layer is located between the subspacer and the element substrate.

In the liquid crystal display device according to one aspect of the present invention, the configuration may be that the main spacer is disposed between pixels of a blue subpixel and a red subpixel having low visibility.

In the liquid crystal display device according to one aspect of the present invention, the configuration may be that the first portion further has third regions having a wider area than the first regions, the subspacers are disposed in the first regions, and the main spacers are disposed in the third regions.

In the liquid crystal display device according to one aspect of the present invention, the configuration may be that a dimension in the row direction of the spacer is less than or equal to a sum of a dimension corresponding to two of the subpixels arranged in the row direction and a dimension of the second portion, which extends in the column direction, in the row direction.

In the liquid crystal display device according to one aspect of the present invention, the configuration may be that a dimension of the spacer in the column direction is less than or equal to a dimension of the second portion in the column direction.

In the liquid crystal display device according to one aspect of the present invention, the configuration may be that the spacer is provided at a center of the first region of the black matrix, and the first region is located around the spacer.

In the liquid crystal display device according to one aspect of the present invention, the configuration may be that a planar shape of the spacer viewed from a normal direction of the opposing substrate is any one of an elliptical shape, a trapezoidal shape, a polygonal shape, and a semicircular shape.

In the liquid crystal display device according to one aspect of the present invention, the configuration may be that the spacer is shaped to have a height of a central portion thereof and a height of a peripheral edge portion thereof that are substantially the same.

Effect of the Invention

According to an aspect of the present invention, it is possible to provide a liquid crystal display device such that it becomes difficult for a foreign object to remain during cleaning and it becomes possible to sufficiently secure a retention strength of a liquid crystal cell thickness.

EMBODIMENTS FOR CARRYING OUT THE INVENTION

Embodiment

Hereinafter, a liquid crystal display device according to an embodiment of the present invention will be described.

The liquid crystal display device of the present embodiment is a transverse electric field type liquid crystal display device that includes a pair of electrodes on one substrate of a pair of substrates between which a liquid crystal layer is sandwiched and drives liquid crystals by applying an electric field between the pair of electrodes. In the present embodiment, an active matrix type liquid crystal display device using an FFS scheme will be described as an example.

Figure 1:
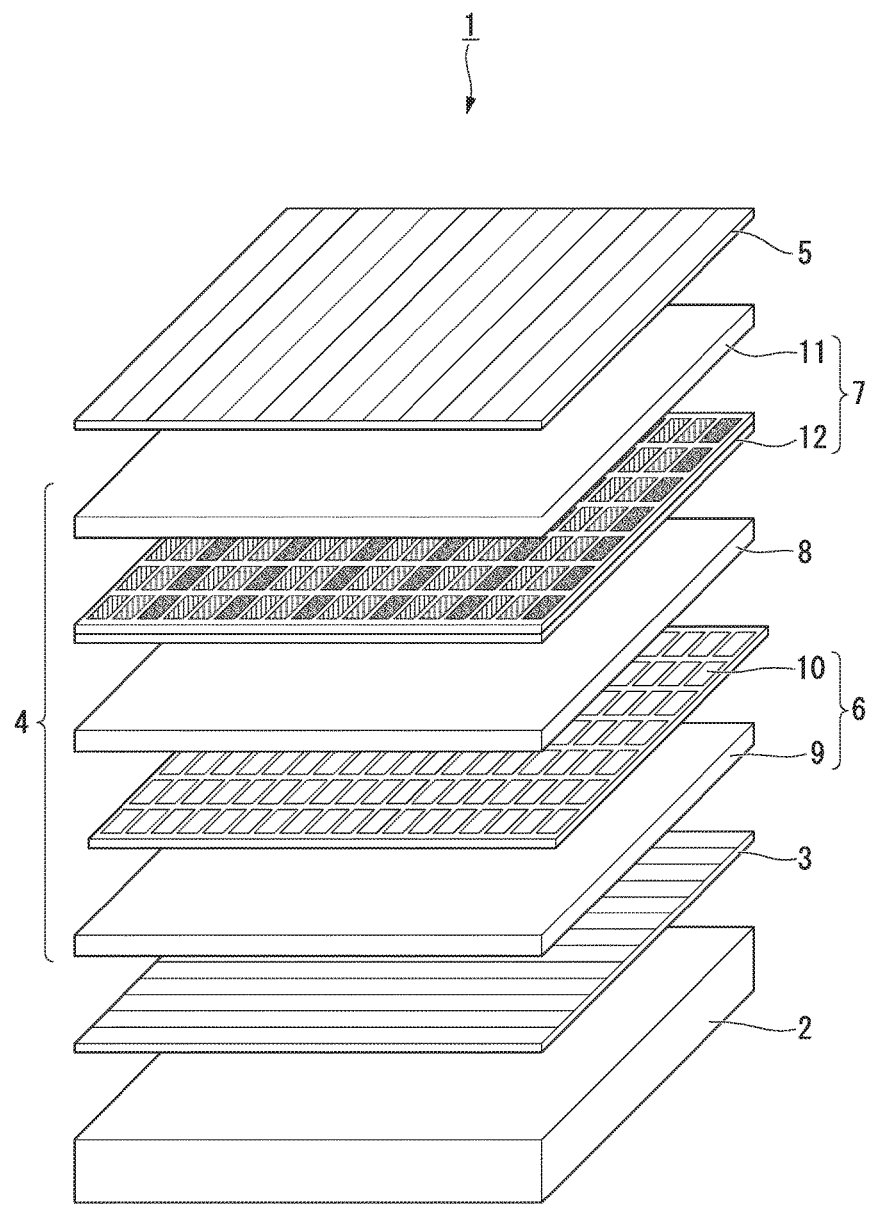
FIG. 1 is an exploded perspective view illustrating a schematic configuration of a liquid crystal display device according to an embodiment.

FIG. 1 is an exploded perspective view illustrating a schematic configuration of a liquid crystal display device 1 according to the embodiment.

In the following drawings, scales of dimensions are made to be different according to constituent elements to facilitate viewing the constituent elements.

As illustrated in FIG. 1, the liquid crystal display device 1 of the present embodiment includes a backlight 2, a polarizing plate 3, a liquid crystal cell 4, and a polarizing plate 5 from a deep side when viewed by an observer. The liquid crystal display device 1 of the present embodiment is a transmissive liquid crystal display device and performs displaying by controlling the transmittance of light emitted from the backlight 2 with the liquid crystal cell 4.

The liquid crystal cell 4 has a thin film transistor (hereinafter abbreviated as "TFT") array substrate 6 and an opposing substrate 7 disposed opposite each other, and a liquid crystal layer 8 is sandwiched between the TFT array substrate (element substrate) 6 and the opposing substrate 7. A positive liquid crystal material is generally used for the liquid crystal layer 8, but a negative type liquid crystal material may be used. The TFT array substrate 6 includes a plurality of subpixels 10 arranged in a matrix on a substrate 9, and a display region (screen) is constituted by the plurality of subpixels 10. The opposing substrate 7 is provided with a color filter 12 on the substrate 11.

Although not illustrated in FIG. 1, the display region has a plurality of source bus lines (signal lines) disposed in parallel to one another and a plurality of gate bus lines (scanning lines) disposed in parallel to one another. The plurality of source bus lines and the plurality of gate bus lines are arranged to intersect one another. The display region is partitioned in a lattice shape by the plurality of source bus lines and the plurality of gate bus lines, and each of substantially rectangular regions obtained through the partitioning is the subpixel 10.

One coloring pattern of red (R), green (G), and blue (B) of the color filter 12 corresponds to one subpixel 10. The "coloring pattern" of the present specification means a minimum unit region of a specific color of the color filter 12 corresponding to one subpixel 10.

Figure 2:
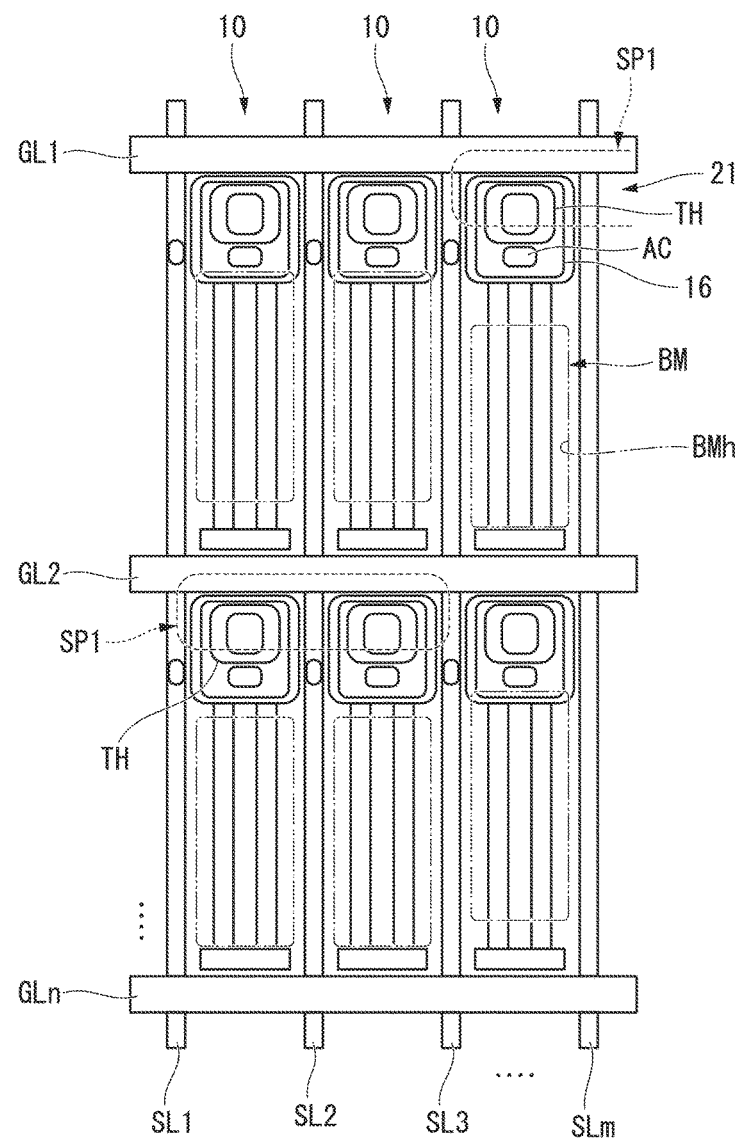
FIG. 2 is a plan view illustrating a part of a display region of a TFT array substrate when viewed from an opposing substrate side.

FIG. 2 is a plan view illustrating a part of the display region of the TFT array substrate 6 when viewed from the opposing substrate 7 side. In FIG. 2, for convenience, a subspacer (spacer) SP1 and a black matrix BM constituting the opposing substrate 7 are illustrated, and a positional relationship with the subpixel 10 is illustrated.

As illustrated in FIG. 2, the TFT array substrate 6 is provided with a plurality of source bus lines SL1 to SLm adjacently arranged in parallel to one another, a plurality of gate bus lines GL1 to GLn adjacently arranged in parallel to one another so that they intersect the plurality of source bus lines SL1 to SLm, and a plurality of pixel electrodes 20.

In the following description, the source bus lines may be collectively referred to as a source bus line SL. The gate bus lines may be collectively referred to as a gate bus line GL.

A portion of the source bus line SL overlapping the gate bus line GL in a plan view has a linear shape orthogonal to an extending direction of the gate bus line GL.

A TFT 21 is provided in the vicinity of an intersection at which the source bus line SL and the gate bus line GL intersect.

The TFT 21 includes a gate electrode (not illustrated) electrically connected to the gate bus line GL, a base coat 13, a semiconductor layer (not illustrated) disposed on the base coat 13, a source electrode 16 electrically connected to the source base bus line SL, and a drain electrode electrically connected to the pixel electrode 20. The semiconductor layer is made with, for example, amorphous silicon, polycrystalline silicon, or an oxide semiconductor (InGaZnOx or the like).

Here, the pixel electrode 20 and the drain electrode of the TFT 21 are connected via a through hole TH. The semiconductor layer and the source electrode 16 are connected via a through hole AC.

Scan signals are sequentially supplied from a gate driver (not illustrated) to the plurality of gate bus lines GL1 to GLn in the order of GL1, GL2, GL3, GLn. In response to the scan signals, the TFT is driven in units of horizontal lines.

Image signals for one horizontal line are supplied to the plurality of source bus lines SL1 to SLm every horizontal period in which a scan signal is supplied from a source driver (not illustrated) to the gate bus line GL.

On the TFT array substrate 6, the plurality of source bus lines SL1 to SLm and the plurality of gate bus lines GL1 to GLn are disposed to intersect each other. A region surrounded by two adjacent source bus lines SL and two adjacent gate bus lines serves as one subpixel 10.

In the present embodiment, the black matrix BM is formed in a region in which the plurality of source bus lines SL1 to SLm and the plurality of gate bus lines GL1 to GLn overlap in a plan view.

In the present embodiment, an open area of an opening BMh of the black matrix BM is defined to be smaller than an area of the subpixel 10. On the TFT array substrate 6, the subpixels 10, which are minimum units of display, are arranged in a matrix.

Also, a width of the source bus line SL and a width of the gate us line GL are smaller than a width of the black matrix BM.

A size of the subpixel. 10 is, for example, a lateral width W1 of about 20 μm and a longitudinal width W2 of about 60 μm. Here, the lateral width W1 is a length of the subpixel 10 in a row direction V1. The longitudinal width W2 is a length of the subpixel 10 in a column direction V2.

In the present embodiment, the "row direction V1" is a direction along the extending direction of the gate bus line GL, and the "column direction V2" is a direction along an extending direction of the source bus line SL.

Next, a sectional configuration of the liquid crystal display device 1 will be described with reference to FIGS. 3 and 4.

Figure 3:
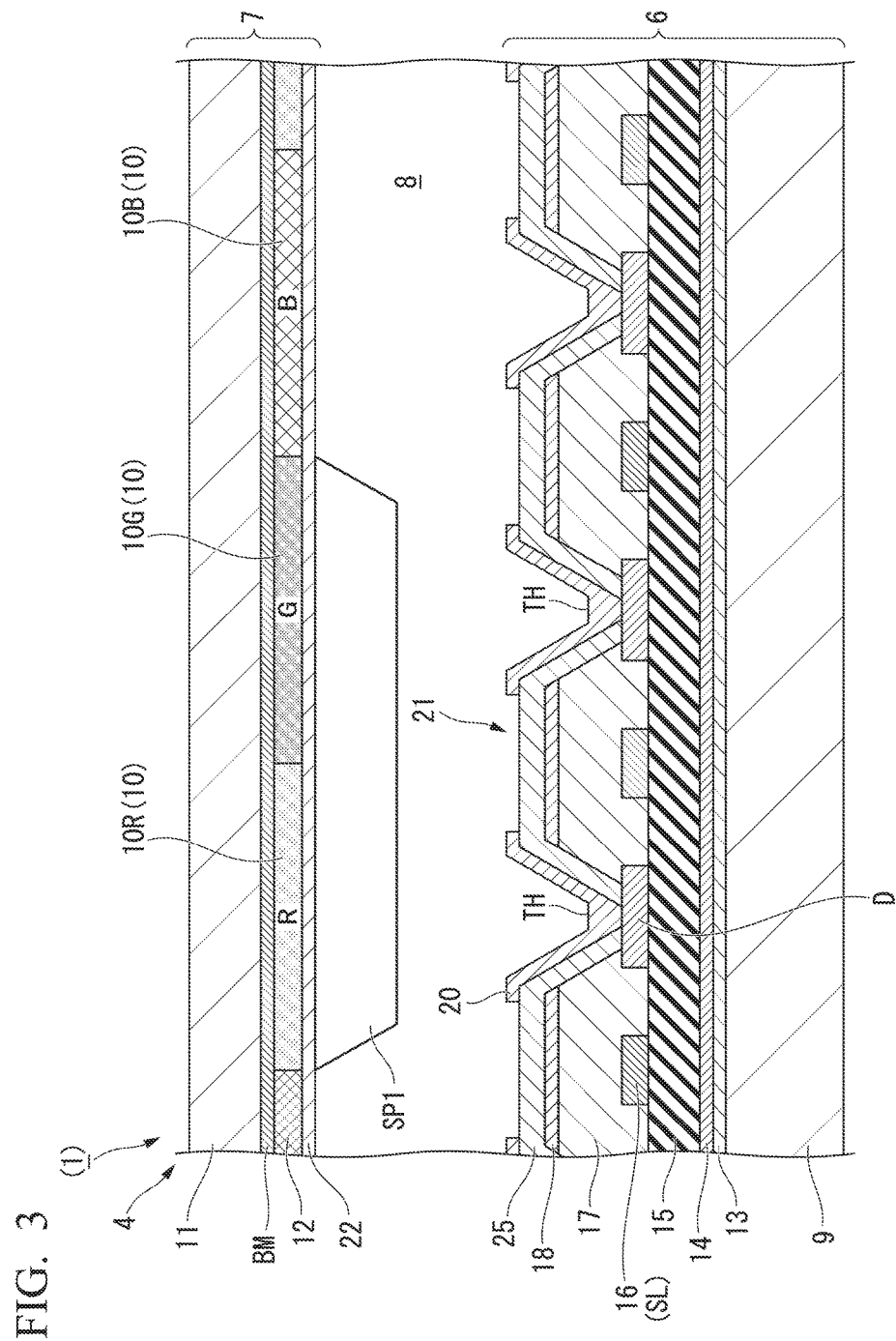
FIG. 3 is a cross-sectional view illustrating a schematic configuration of a subspacer of the liquid crystal display device and a periphery thereof in the embodiment.

FIG. 3 is a cross-sectional view illustrating a schematic configuration of a subspacer of the liquid crystal display device and a periphery thereof in the embodiment. FIG. 4 is a cross-sectional view illustrating a schematic configuration of a main spacer of the liquid crystal display device and a periphery thereof in the embodiment. In FIGS. 3 and 4, the illustration of the backlight 2, the polarizing plate 3, the polarizing plate 5, and the like illustrated in FIG. 1 is omitted for the sake of convenience.

(TFT Array Substrate)

First, a configuration of the TFT array substrate 6 will be described.

As illustrated in FIG. 3, the TFT array substrate 6 includes the substrate 9 including a transparent substrate such as a glass substrate. On the substrate 9, the base coat 13 is formed. As the base coat 13, for example, an inorganic insulating material such as a silicon nitride film, a silicon oxide film, a silicon nitride oxide film, or a laminated film thereof can be used.

A gate electrode (not illustrated) is formed on the gate insulating film 14. As a material for forming the gate electrode, for example, a laminated film of tungsten (W)/tantalum nitride (TaN), molybdenum (Mo), titanium (Ti), aluminum (Al), or the like can be used. Also, the gate electrode includes a part of the gate bus line GL.

The gate insulating film 14 is formed on the gate electrode. As a material for forming the gate insulating film 14, an inorganic insulating material similar to that of the above-described base coat 13 can be used.

An interlayer insulating film 15 is formed on the gate insulating film 14. As a material for forming the interlayer insulating film 15, an inorganic insulating material similar to that of the above-described base coat 13 can be used.

On the interlayer insulating film 15, the source electrode 16 is formed. As a material for forming the source electrode 16, a conductive material similar to that of the above-described gate electrode can be used.

On the interlayer insulating film 15, an organic insulating film 17 is formed to cover the source electrode 16. As a material for forming the organic insulating film 17, an organic insulating material such as polyimide, polyimide, acrylic, polyimide amide, benzocyclobutene, or the like can be used.

On the organic insulating film 17, a common electrode 18 is formed. As a material for forming the common electrode 18, a transparent conductive material such as indium tin oxide (ITO), indium zinc oxide (IZO), or the like can be used.

A protective film 25 is formed on the common electrode 18. As a material for forming the protective film 25, an inorganic insulating material similar to that of the above-described base coat 13 can be used. The protective film 25 is formed to cover the common electrode 18 and insulates the common electrode 18 and the pixel electrode 20.

The pixel electrode 20 is formed on the protective film 25. As a material for forming the pixel electrode 20, a transparent conductive material similar to that of the above-described common electrode 18 can be used. An alignment film (not illustrated) is formed on an outermost surface (the liquid crystal layer 8 side) of the TFT array substrate 6. The alignment film has an alignment regulating force for horizontally aligning liquid crystal molecules constituting the liquid crystal layer 8.

Next, a configuration of the opposing substrate 7 will be described.

As the substrate 11, a transparent substrate such as a glass substrate can be used. The opposing substrate 7 is a color filter substrate in which the color filter 12 and the black matrix BM are formed on the substrate 11. On the substrate 11, the black matrix BM and the color filter 12 are formed in the stated order. An overcoat 22 is formed on the liquid crystal layer 8 side of the color filter 12.

As illustrated in FIG. 3, in the present embodiment, a plurality of subspacers (spacers) SP1 are formed on the liquid crystal layer 8 side of the overcoat 22. The subspacer SP1 has a predetermined height, is formed on the opposing substrate 7 side, and is configured not to contact the TFT array substrate 6. When the liquid crystal display device 1 is pushed from the opposing substrate 7 side, the subspacer SP1 comes into contact with the TFT array substrate 6. The subspacer SP1 is a spacer for improving a strength against a pressing pressure when the liquid crystal display device 1 is pushed from the opposing substrate 7 side. An alignment film (not illustrated) is formed on the outermost surface (the liquid crystal layer 8 side) of the opposing substrate 7.

Figure 4:
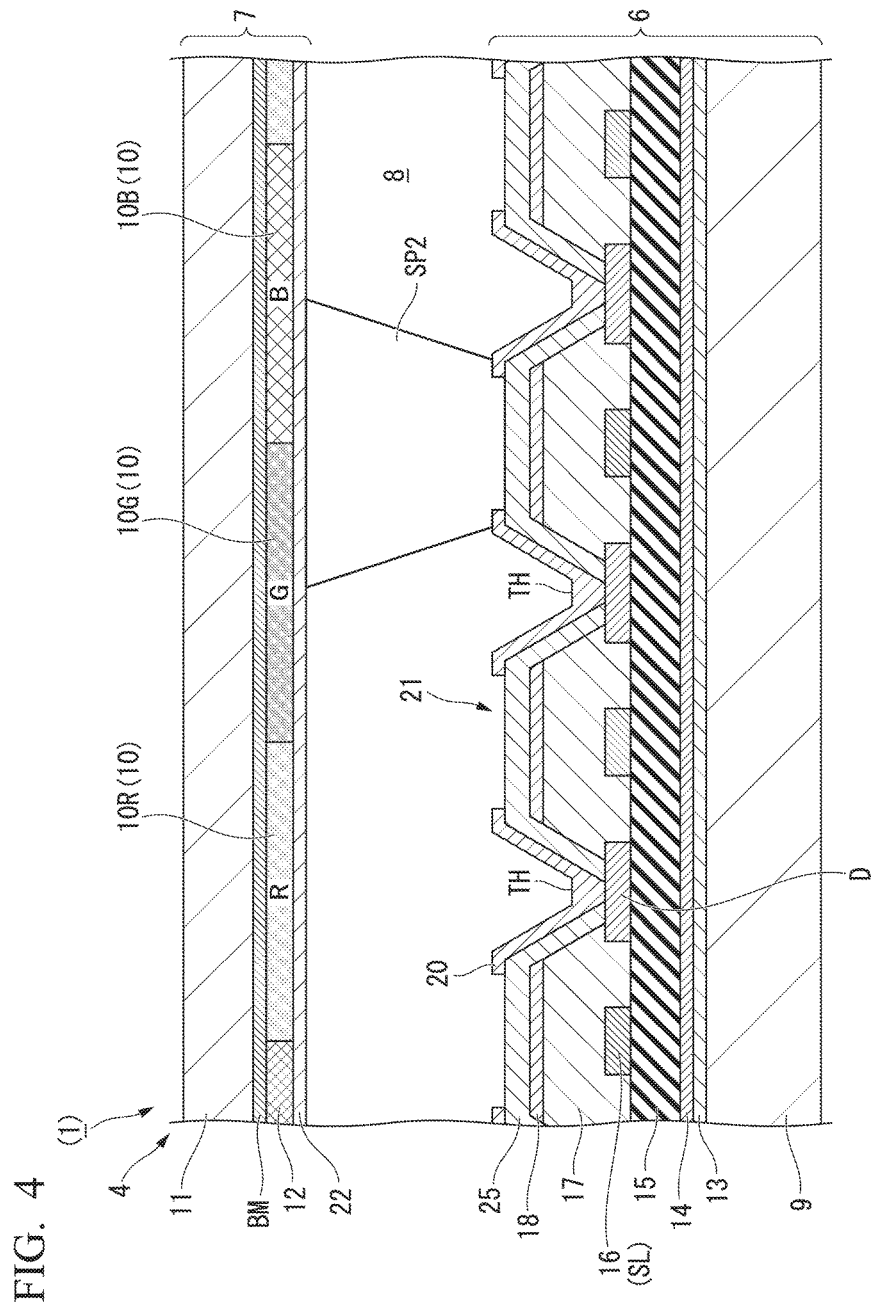
FIG. 4 is a cross-sectional view illustrating a schematic configuration of a main spacer of the liquid crystal display device and a periphery thereof in the embodiment.

Also, as illustrated in FIG. 4, a plurality of main spacers (spacers) SP2 in contact with the TFT array substrate 6 and the opposing substrate 7 are disposed between the TFT array substrate 6 and the opposing substrate 7. The main spacer SP2 is a columnar spacer for uniformly retaining a cell thickness of the liquid crystal cell 4.

Figure 5:
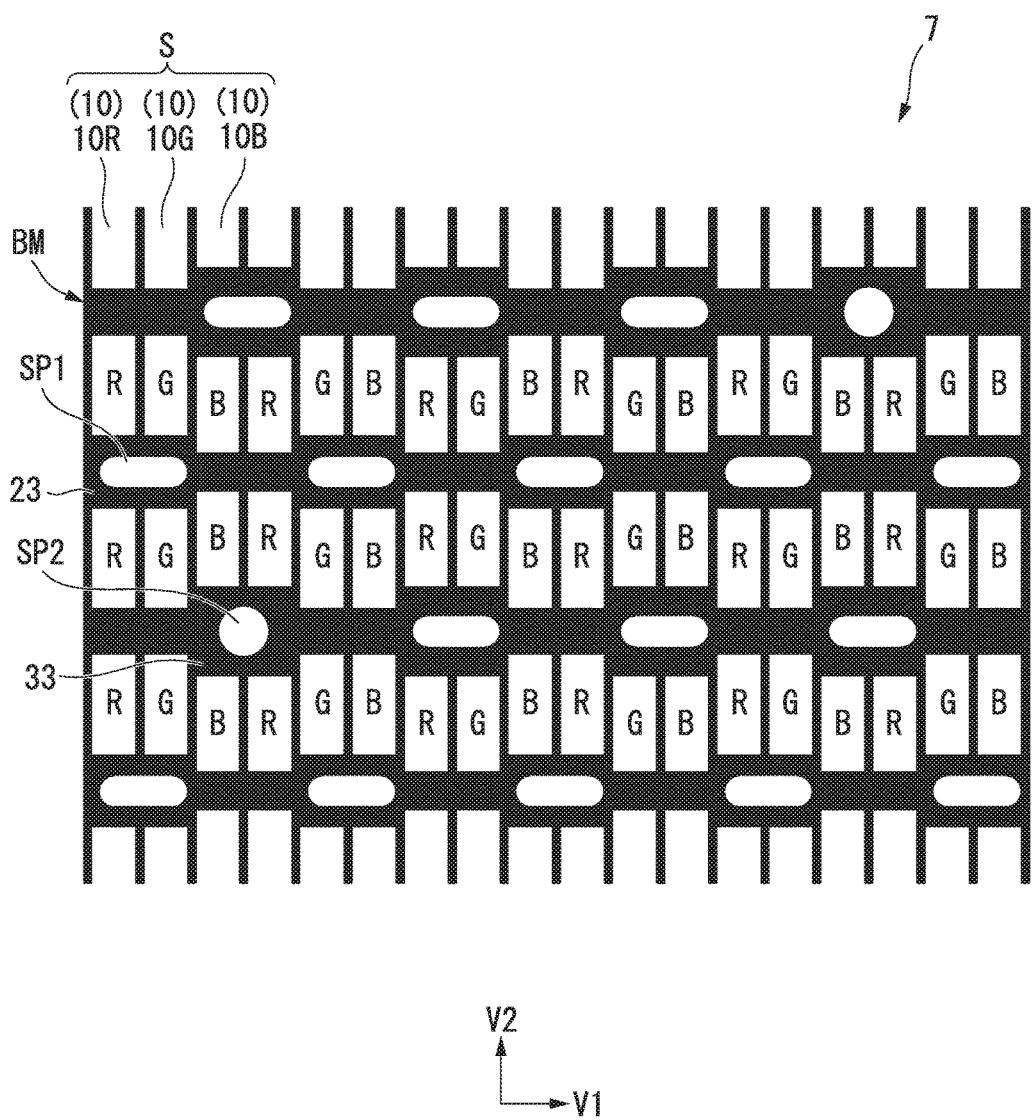
FIG. 5 is a plan view illustrating a position of a main spacer of an opposing substrate in the embodiment.

FIG. 5 is a plan view illustrating a position of the main spacer of the opposing substrate in the embodiment.

As illustrated in FIG. 5, in the present embodiment, one pixel P is constituted by three subpixels of a red subpixel 10R that emits red (R) light, a green subpixel 10G that outputs green (G) light, and a blue subpixel 10B that outputs blue (B) light. The red subpixel 10R, the green subpixel 10G, and the blue subpixel 10B are arranged in the stated order in the row direction V1.

On the opposing substrate 7 side, the plurality of subspacers SP1 and the plurality of main spacers SP2 are provided. The subspacer SP1 is provided on a surface of the TFT array substrate 6 side of the opposing substrate 7 such that the height thereof is lower than that of the main spacer SP2, and the liquid crystal layer 8 is located between the subspacer SP1 and the TFT array substrate 6.

The main spacer SP2 is provided at a predetermined position so that the cell thickness can be uniformly retained within the display region, and the number of main spacers SP2 to be installed is arbitrary. In the present embodiment, from the viewpoint of color visibility such as high green visibility, the main spacer SP2 is disposed between the pixels of the blue subpixel 10B and the red subpixel 10R having low color visibility.

In the present embodiment, a planar shape of the subspacer SP1 is elliptical, and a planar shape of the main spacer SP2 is circular. The subspacer SP1 has an elliptical shape having dimensions in the row direction V1 rather than the column direction V2. The planar shapes of the subspacer SP1 and the main spacer SP2 are not limited to the above-described shapes. For example, the planar shape of the subspacer SP1 may be trapezoidal, polygonal or semicircular. Also, the main spacer SP2 may have the same shape as the subspacer SP1.

Figure 6A:
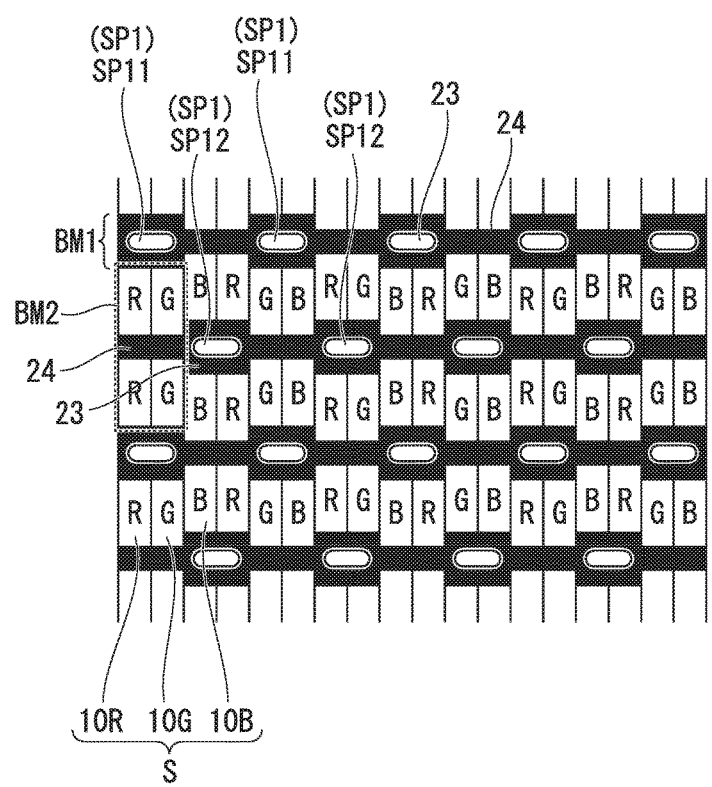
FIG. 6A is a plan view illustrating a schematic configuration of the opposing substrate in the embodiment.

FIG. 6A is a plan view illustrating a schematic configuration of an opposing substrate in one embodiment.

The subspacers SP1 are provided at a ratio of one subspacer for every four subpixels 10, as indicated by a region surrounded by a broken line in FIG. 6A, and are disposed every two subpixels 10 in the column direction (the column direction V2) and the row direction (the row direction V1) of the pixel arrangement. That is, subspacers SP11 arranged in odd-numbered rows and subspacers SP12 arranged in even-numbered rows do not adjoin each other in the column direction.

In the following description, when the subspacers SP11 and SP12 are not distinguished, they are simply referred to as the subspacers SP1.

The plurality of subpixels 10 are partitioned by the black matrix BM provided on the opposing substrate 7 side. The black matrix BM has a plurality of first portions BM1 and a plurality of second portions BM2. Each of the first portions BM1 is located between the subpixels 10 of the same color extending in the row direction (the row direction V1) and adjacent to each other in the column direction (the column direction V2). Each of the second portions BM2 is located between the subpixels 10 of different colors extending in the column direction V2 and adjacent to each other in the row direction V1.

The first portion BM1 has an enlarged portion (a first region) 23 and a reduced portion (a second region) 24 which are alternately present in an extending direction thereof. The subspacer SP1 is disposed at a position overlapping the enlarged portion 23 in a plan view in a normal direction of the opposing substrate 7. In addition to the enlarged portion 23, in which the subspacer SP1 is disposed, and the reduced portion 24, one or more enlarged portions (third regions) 33, in which the main spacer SP2 is disposed, are provided in any of a plurality of first portions BM1. The enlarged portion 33 has a wider area than the enlarged portion 23.

The second portion BM2 prevents color mixing in the subpixels 10R, 10G, and 10B and has a narrower shape than the reduced portion 24.

In the present embodiment, the subspacer SP1 is disposed in the enlarged portion 23 and the main spacer SP2 is disposed in the enlarged portion 33. However, it is unnecessary to provide the subspacer SP1 or the main spacer SP2 in each of all of the enlarged portions 23 and 33. The enlarged portion 23 or 33 in which the subspacer SP1 or the main spacer SP2 is not disposed may exist.

Figure 6B:
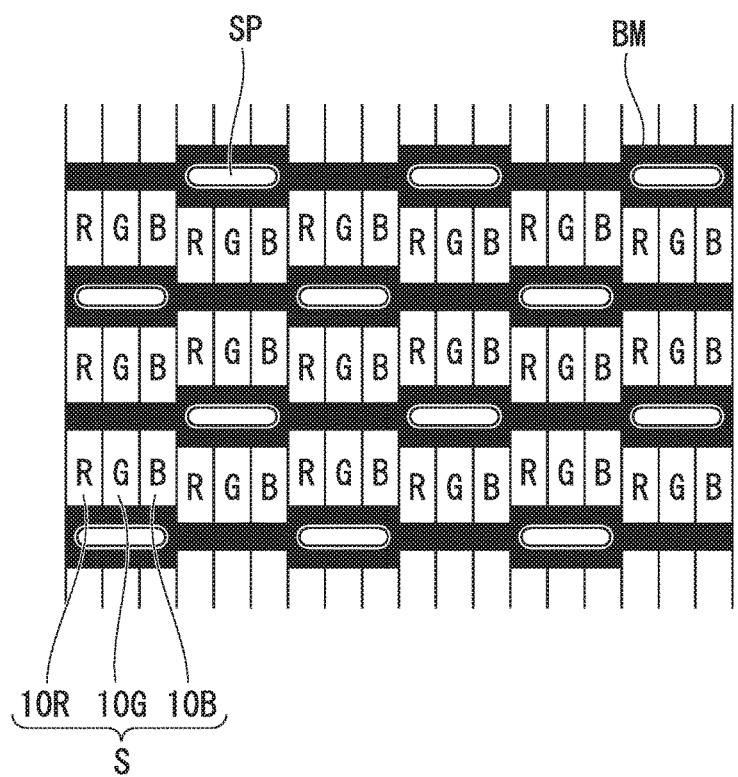
FIG. 6B is a plan view illustrating an arrangement of subspacers in a configuration of Comparative Example 1.

FIG. 6B is a plan view illustrating an arrangement of subspacers in a configuration of Comparative Example 1.

In the configuration of Comparative Example 1, as illustrated in FIG. 6B, because the subspacers SP1 are provided at a ratio of one subspacer to six subpixels, the shapes of three subpixels 10 constituting one pixel P have the same layout.

In the configuration of the present embodiment, as illustrated in FIG. 6A, two of the subpixels 10 among the three subpixels 10 constituting one pixel P have the same layout. That is, the remaining one subpixel 10 has the same layout as one subpixel 10 in another adjacent pixel. Consequently, the subpixels 10 have the same layout two by two in the pixel array arranged in the row direction V1.

An aperture ratio of the black matrix BM of the present embodiment illustrated in FIG. 6A is maintained to be substantially equal to an aperture ratio of the conventional black matrix BM illustrated in FIG. 6B.

Figure 7:
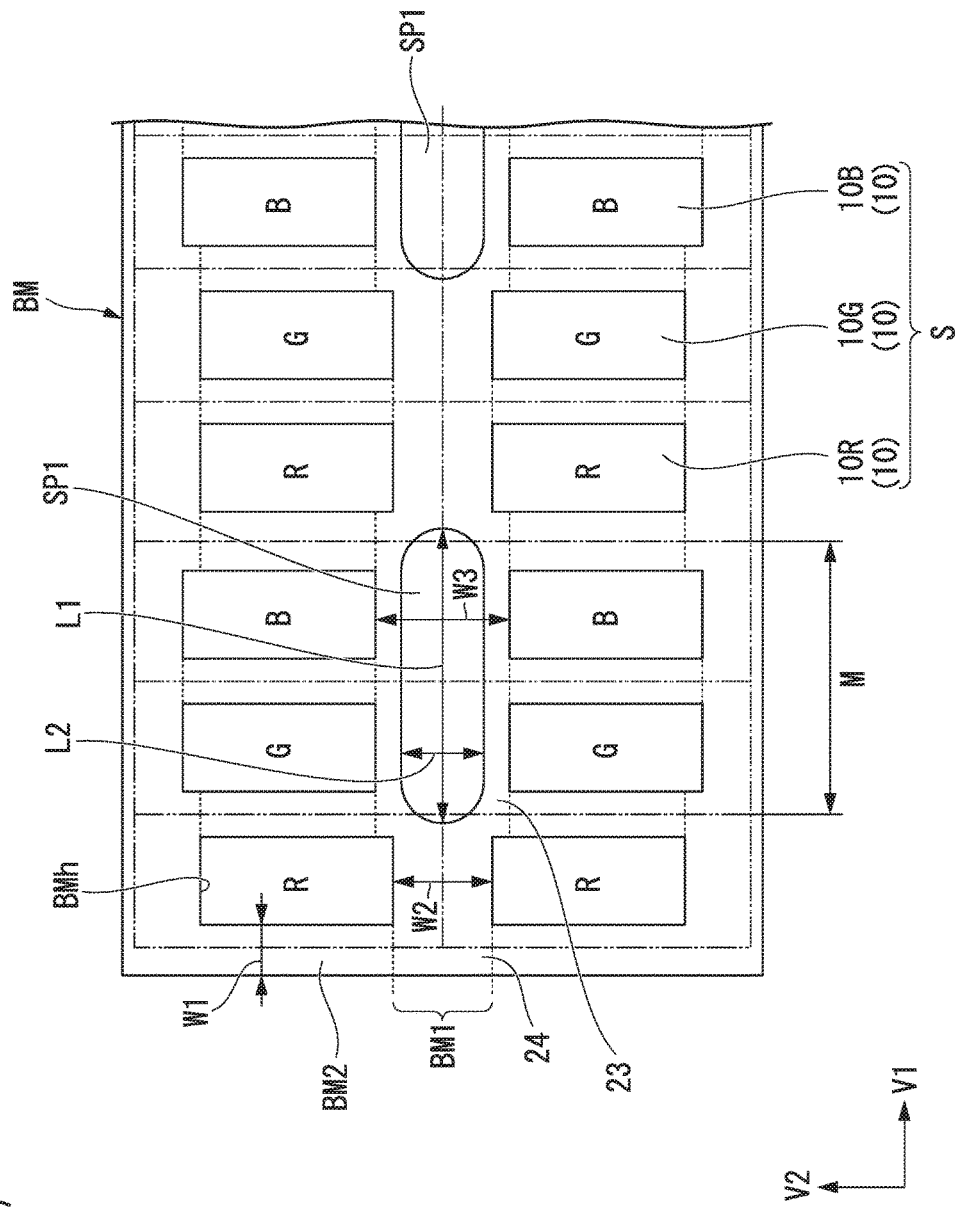
FIG. 7 is a plan view illustrating shapes of a subspacer and a black matrix.

FIG. 7 is a plan view illustrating the shapes of the subspacer and the black matrix. In the following description, FIG. 5 will be appropriately referred to.

Configurations of the black matrix BM and the subspacer SP1 will be described in detail with reference to FIGS. 5 and 7.

(Dimensions of Black Matrix BM)

As illustrated in FIGS. 5 and 7, a width W1 of the second portion BM2 extending in the column direction V2 of the black matrix BM is approximately 4 to 6 µm. The width W1 of the second portion BM2 corresponds to a gap between the subpixels 10 of different colors.

Also, a width W2 of the reduced portion 24 of the first portion BM1 extending in the row direction V1 is approximately 12 to 16 µm. The width W2 of the reduced portion 24 corresponds to a gap between the subpixels 10 of the same color in which no subspacer SP1 is disposed. A width W3 of the enlarged portion 23 of the first portion BM1 is approximately 15 to 21 µm. The width W3 of the enlarged portion 23 corresponds to a gap between the subpixels 10 of the same color in which the subspacer SP1 is disposed.

(Dimensions of Subspacer SP1)

As illustrated in FIG. 7, the subspacer SP1 has an elliptical shape in a plan view, and the dimension in the row direction V1 is longer than the dimension in the column direction V2. More specifically, side surfaces of both sides in the column direction V2 are planar, and side surfaces of both sides in the row direction V1 are semicircular. A length (a lateral width) L1 in the row direction V1 of the subspacer SP1 has a dimension less than or equal to a sum of a dimension M corresponding to two subpixels 10 arranged in the row direction V1 and a width dimension W1 of the second portion BM2 of the black matrix BM.

The main spacer SP2 may be formed to have the same dimensions as the subspacer SP1.

A longitudinal width L2 of the subspacer SP1 in the column direction V2 is set to be less than or equal to the dimension in the row direction V1 of the enlarged portion 23 of the black matrix BM, and is approximately 8 to 12 µm in the present embodiment.

The subspacer SP1 is provided at the center of the enlarged portion 23 of the black matrix BM, and the enlarged portion 23 is located (exposed) around the subspacer SP1. Thereby, even if an alignment disorder of the liquid crystal is caused by the subspacer SP1, a region thereof can be shielded by the enlarged portion 23.

Meanwhile, because the main spacer SP2 illustrated in FIG. 5 has a higher height than the subspacer SP1, an alignment disorder of the liquid crystal is liable to occur around the main spacer SP2. Thus, an area of the enlarged portion 33 of the black matrix BM overlapping the main spacer SP2 in a plan view is made to be larger than the area of the enlarged portion 23 overlapping the subspacer SP1 in a plan view. Thereby, even if an alignment disorder of the liquid crystal is caused by the main spacer SP2, a region thereof can be shielded by the enlarged portion 33.

Figure 8:
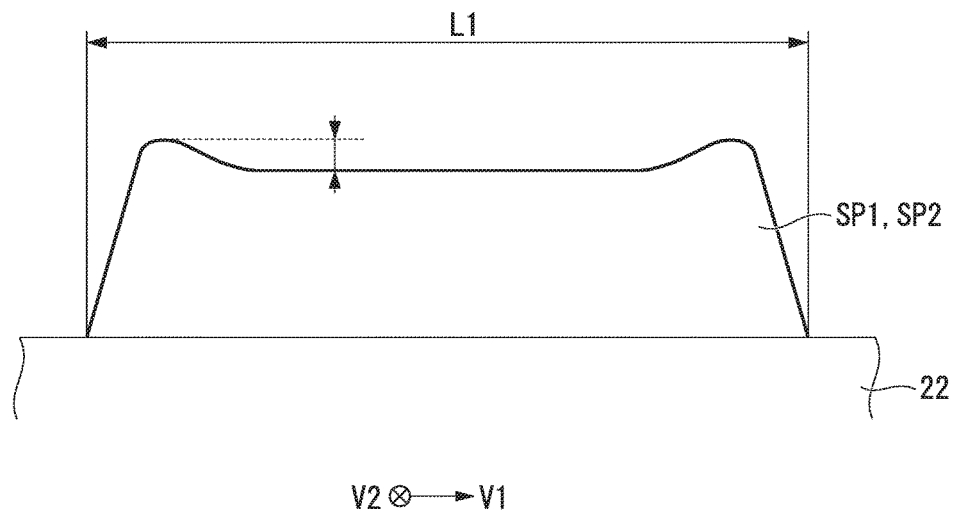
FIG. 8 is a side view illustrating a shape of a subspacer or a main spacer having a length.

FIG. 8 is a side view illustrating the shape of the subspacer or the main spacer. The subspacer SP1 of the present embodiment has a shape in which a height of a central portion thereof in a cross section is substantially equal to a height of a peripheral edge portion thereof (see FIG. 3).

On the other hand, as illustrated in FIG. 8, if the extension length L1 of the subspacer SP1 in the row direction V1 is long, a photosensitive resin is raised around the periphery thereof when the subspacer SP1 is manufactured and a central portion thereof is concave. Thus, if the length L1 of the subspacer SP1 is shorter, it is possible to minimize a concave shape of the central portion.

Also, in the main spacer SP2, the height of the central portion in the cross section and the height of the peripheral edge portion are substantially equal (see FIG. 4). Even when the main spacer SP2 has the same shape as the subspacer SP1, if the extension length L1 of the main spacer SP2 in the row direction V1 is made to be long, as illustrated in FIG. 8, a photosensitive resin is raised around the periphery thereof when the main spacer SP2 is manufactured and a central portion thereof is concave. Thus, if the length L1 of the main spacer SP2 is shorter, it is possible to minimize a concave shape of the central portion.

Here, when the lengths L1 of the subspacer SP1 and the main spacer SP2 are too short, a pressing strength thereof is weak. Because a degree of depression (a range indicated by an arrow in FIG. 8) varies with a material of the photosensitive resin that is used, it is preferable for the lengths L1 of the subspacer SP1 and the main spacer SP2 to be set according to the material.

Figure 9:
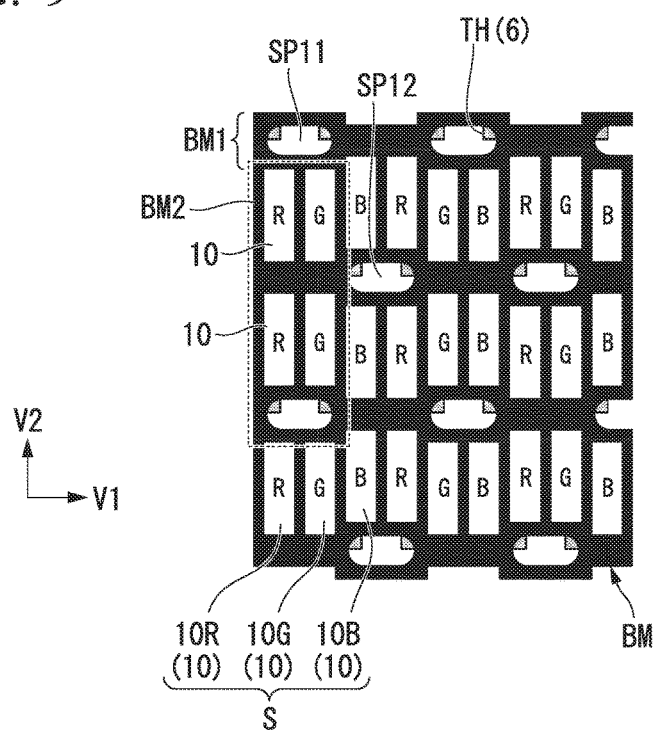
FIG. 9 is a plan view illustrating a positional relationship between a subspacer and a through hole in the embodiment.

FIG. 9 is a plan view illustrating a positional relationship between the subspacer and the through hole.

In the present embodiment, as illustrated in FIG. 9, one subspacer SP1 is arranged for every four subpixels 10. Each of the subspacers SP1 overlaps the through hole TH of the TFT 21 provided on the TFT array substrate 6 side in a plan view. The subspacer SP1 of the present embodiment is formed across two adjacent subpixels 10 in the row direction V1. Thus, one subspacer SP1 overlaps the through holes TH of the two subpixels 10, and a central portion of the subspacer SP1 is positioned between both of the through holes TH.

Also, if the main spacer SP2 has the same shape as the subspacer SP1 and one of the plurality of subspacers SP1 illustrated in FIG. 9 is the main spacer SP2, one main spacer SP2 overlaps the through holes TH of two subpixels 10, as in the above-described subspacer SP1.

Figure 10A:
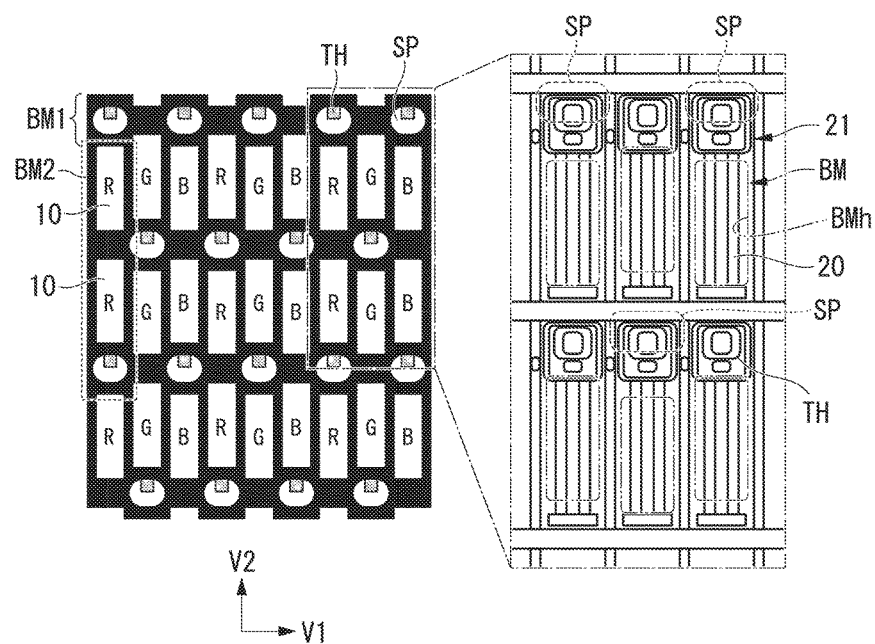
FIG. 10A is a plan view illustrating a positional relationship between a subspacer and a through hole in a configuration of Comparative Example 2.

As illustrated in FIG. 10A, in the case of a configuration of Comparative Example 2 in which one subspacer SP is provided for two subpixels 10, one subspacer SP overlaps the through hole TH in one subpixel 10. The shape of the subspacer SP in a plan view is close to a circle, and an area thereof overlapping the through hole TH is larger than that of the configuration of the present embodiment. As illustrated in FIG. 3, a cross-sectional shape of the through hole TH is concave. When an overlapping area between the subspacer SP and the through hole TH increases, a force for maintaining a cell thickness thereof is weak at a time of pressing from the opposing substrate 7 side. In order to secure the retention strength (pushing pressure strength) of the cell thickness, it is necessary to increase a size of the subspacer SP in the plan view and reduce an overlapping area between the subspacer SP and the through hole TH.

Figure 10B:
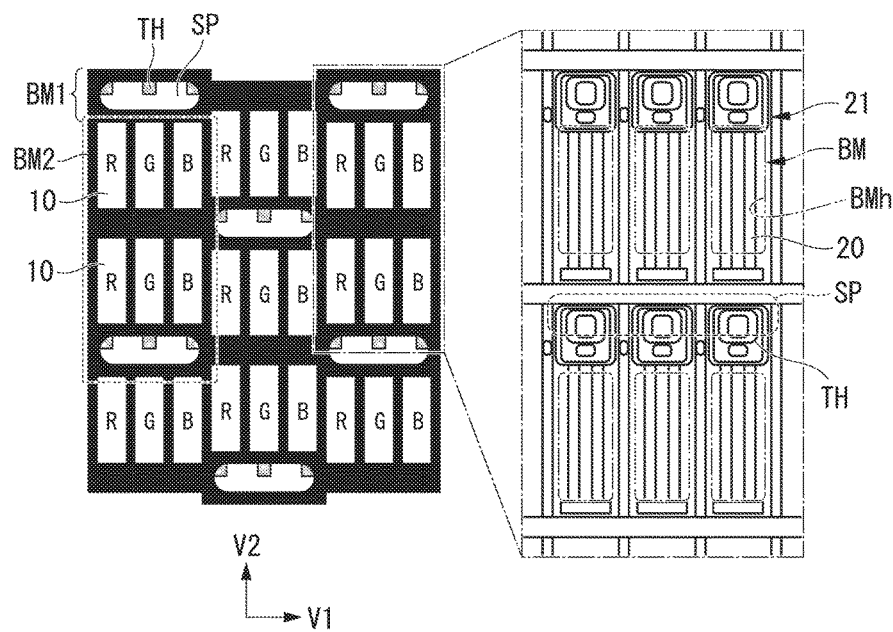
FIG. 10B is a plan view illustrating a positional relationship between a subspacer and a through hole in the configuration of Comparative Example 1.

On the other hand, if the planar shape of the subspacer SP is increased by lengthening the dimension thereof in the row direction V1, as in the configuration of Comparative Example 1 in which one subspacer SP is provided for six subpixels 10 illustrated in FIG. 10B, the overlapping area between the subspacer SP and the through hole TH decreases and the retention strength of the cell thickness can be improved. However, because the extension length (a lateral width in the row direction V1) of the subspacer SP is longer, dust easily sticks to the subspacer SP when a cleaning liquid flows from the column direction V2 intersecting the extending direction of the subspacer SP in a process of cleaning the substrate surface.

Figure 11:
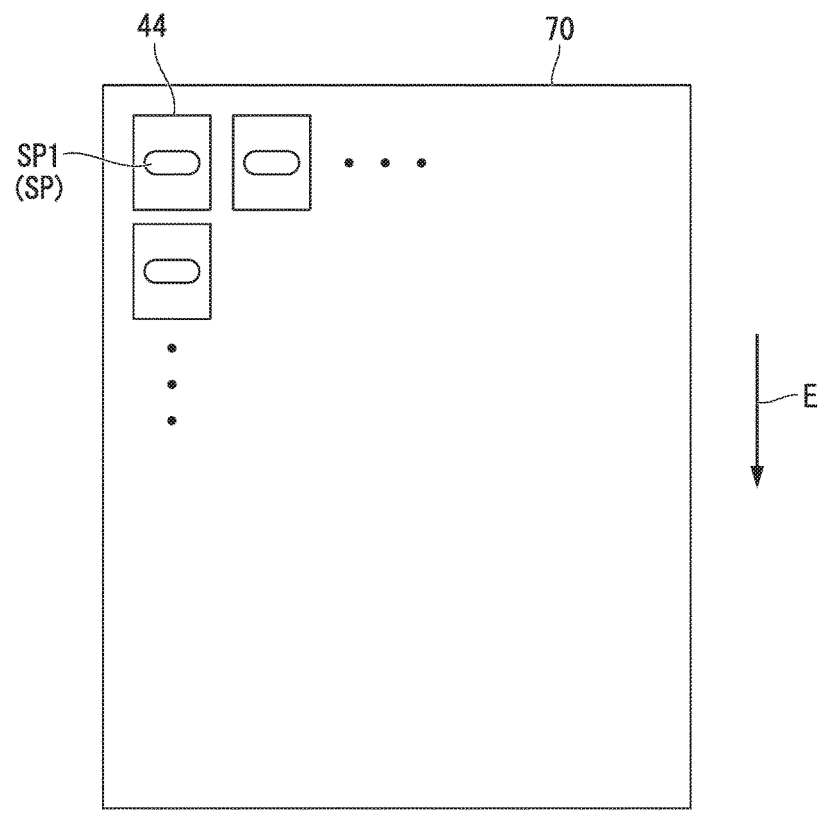
FIG. 11 is a diagram illustrating a process when the liquid crystal display device according to the embodiment of the present invention is manufactured.

FIG. 11 is a diagram illustrating a process when the liquid crystal display device according to the embodiment of the present invention is manufactured.

As illustrated in FIG. 11, the liquid crystal display device according to the embodiment of the present invention is obtained by collectively manufacturing a plurality of panels from large-sized mother glass. In FIG. 11, a plurality of liquid crystal panels 44 set on the mother glass are schematically illustrated, and an external form of the liquid crystal panel 44 and the subspacer SP1 are illustrated. An arrow E in FIG. 11 indicates a direction in which the mother glass is cleaned in the cleaning process.

As illustrated in FIG. 11, the extending direction of the subspacer SP1 provided in each of the liquid crystal panels 44 intersects the direction in which the cleaning liquid flows during the cleaning process on a large-sized mother glass 70.

This setting is performed to increase the number of liquid crystal panels 44 to be taken out of the mother glass 70 as much as possible. If the extending direction of the subspacer SP1 is formed in a cleaning direction of the mother glass 70, the number of liquid crystal panels 44 capable of being manufactured from one mother glass 70 decreases.

Figure 12A:
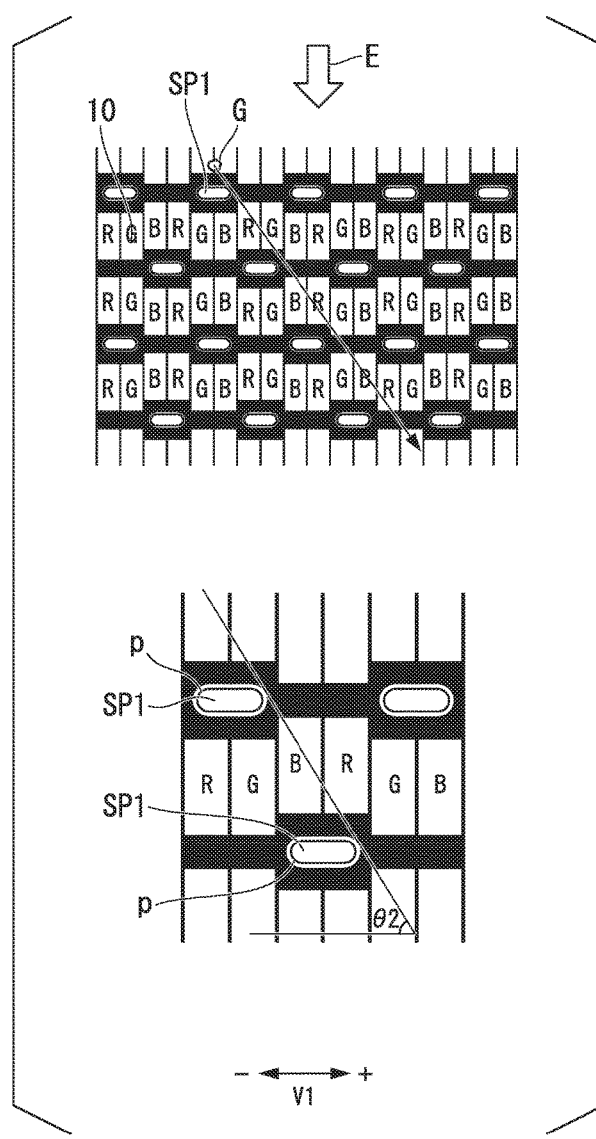
FIG. 12A is a diagram illustrating a cleaning state when the liquid crystal display device of the embodiment is manufactured.
Figure 12B:
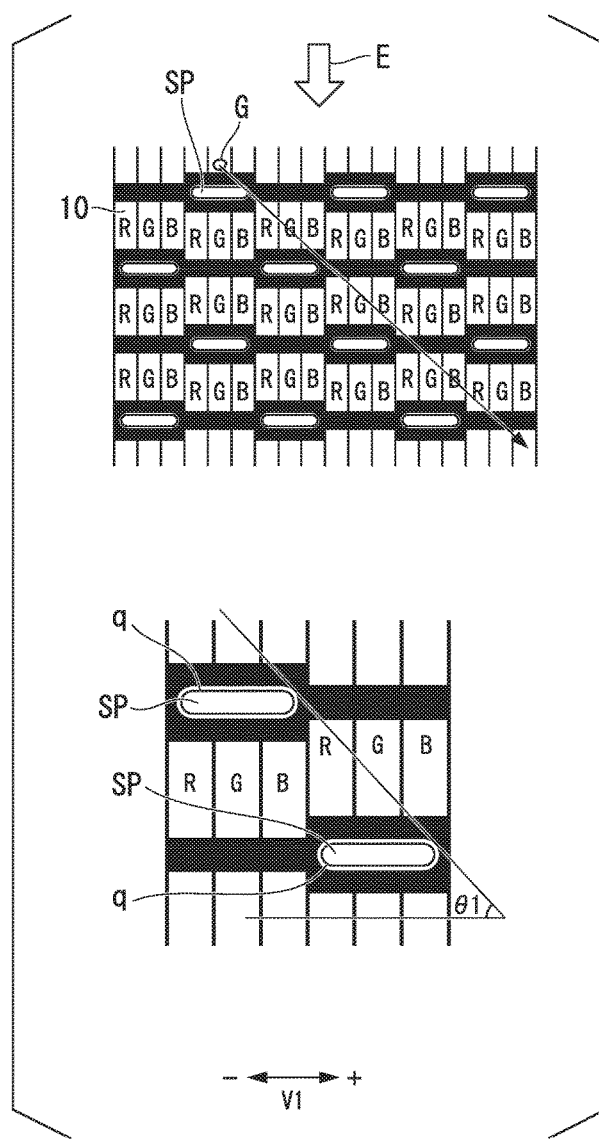
FIG. 12B is a diagram illustrating a cleaning state when a liquid crystal display device of Comparative Example 1 is manufactured.

FIG. 12A is a diagram illustrating a cleaning state when the liquid crystal display device of the present embodiment is manufactured. FIG. 12B is a diagram illustrating a cleaning state when the liquid crystal display device of Comparative Example 1 is manufactured.

Here, a part (opposing substrate side) of the liquid crystal panel 44 formed on a mother glass substrate is enlarged and illustrated.

In the case of the configuration of Comparative Example 1 illustrated in FIG. 12B, because the subspacer SP has a length that extends across the three subpixels 10, a foreign object G is easily caught thereon during cleaning. On the other hand, in the case of the configuration of present embodiment illustrated in FIG. 12A, because the extension length of the subspacer SP1 is short enough to extend across two subpixels 10, it is difficult for the foreign object G to get caught thereon during cleaning when compared to the configuration of Comparative Example 1.

Here, in FIG. 12A, an angle formed by connecting end parts p of a +V1 side at one ends in the row direction V1 between the closest subspacers SP1 in the cleaning direction is designated as θ2. Also, in FIG. 12B, an angle formed by connecting end parts q of a +V1 side at one ends in the row direction V1 between the closest subspacers SP1 in the cleaning direction is θ1. Then, a relationship between the angle θ1 of an arrangement of the subspacers SP1 with respect to the cleaning direction in the configuration of Comparative Example 1 and the angle θ2 of an arrangement of the subspacers SP1 in the configuration of the present embodiment is θ2>θ1.

That is, because an angle θ of the arrangement of the subspacers SP1 with respect to the cleaning direction is larger in the configuration of the present embodiment, a flow of the cleaning liquid flowing between the subspacers SP1 is closer to the cleaning direction indicated by an arrow E. Thus, it is more difficult for the foreign object G to get caught on the subspacer SP1 than in the configuration of Comparative Example 1, and the foreign object G easily flows with the cleaning liquid. Consequently, it is difficult for the foreign object to remain on the substrate during cleaning, and performance of the liquid crystal display device can be improved.

Figure 13A:
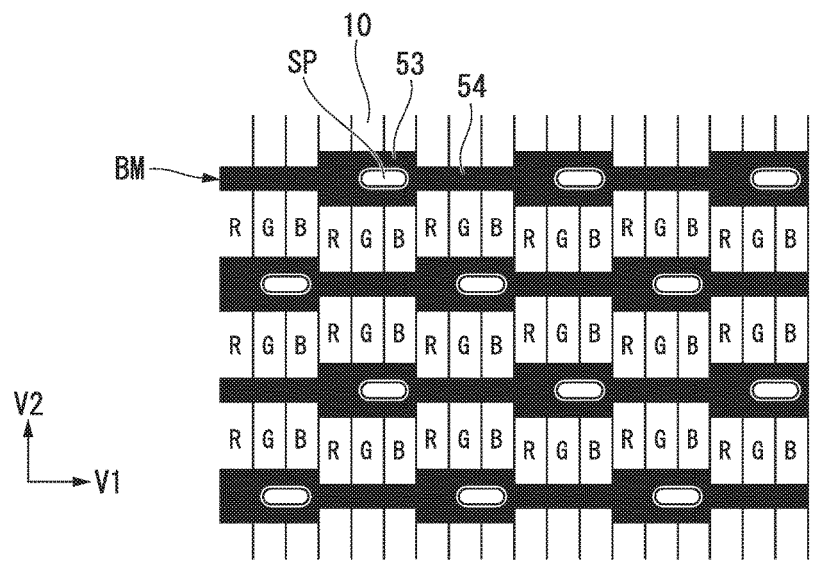
FIG. 13A is a diagram in which a length of a subspacer in the configuration Comparative Example 1 is shortened.
Figure 13B:
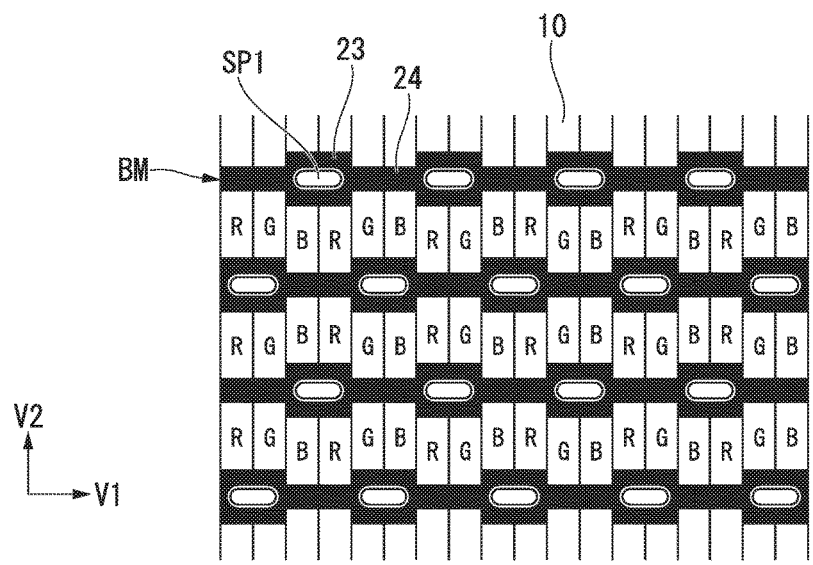
FIG. 13B is a diagram illustrating a configuration of the embodiment.

FIG. 13A is a diagram in which a lateral width of a columnar spacer in the configuration of Comparative Example 1 is shortened, and FIG. 13B is a diagram illustrating a configuration of the present embodiment.

In order to facilitate a flow of a foreign object during the cleaning process, as illustrated in FIG. 13A, the lateral width (an extension length in the row direction V1) of the subspacer SP was shortened. Here, the subspacer SP had the same length (shape) as the subspacer SP1 of the present embodiment. Thus, it was difficult for the foreign object to be caught by the subspacer SP during cleaning.

However, in the configuration of Comparative Example 1 in which one subspacer SP is disposed for three subpixels 10 arranged in the row direction V1, the number of the subspacers SP is not increased by simply shortening the length of the subspacer SP. Thus, even though cleaning efficiency is improved, the retention strength of the cell thickness decreases.

Further, the shape of the black matrix BM remains the same as that of Comparative Example 1. The black matrix BM of Comparative Example 1 is configured so that an enlarged portion 53 is located across three subpixels 10 arranged in the row direction V1 and a reduced portion 54 is located across three adjacent subpixels 10 in the same direction. Thus, the black matrix BM is also located in a region in which the subspacer SP does not exist in the enlarged portion 53 and light is shielded by the subspacer SP up to a region in which an alignment disorder of the liquid crystal is not caused so that an aperture ratio thereof is inefficient.

On the other hand, because one subspacer SP1 is disposed for two subpixels 10 arranged in the row direction V1 in the configuration of the present embodiment illustrated in FIG. 13B, the number of subspacers SP1 is larger than that of the configuration of Comparative Example 1 illustrated in FIG. 13A. Thus, even when the lateral width (the extension length in the row direction V1) of the subspacer SP1 is short, the retention strength of the cell thickness is secured.

Also, the enlarged portion 23 of the black matrix BM in the present embodiment has a size corresponding to two subpixels 10, like the subspacer SP1. Thus, only the region in which an alignment disorder of the liquid crystal occurs is efficiently shielded by the subspacer SP1. Consequently, according to the present embodiment, it is difficult for a foreign object to get caught during cleaning and the black matrix BM can be efficiently used for shielding light of the subspacer SP1.

Figure 16A:
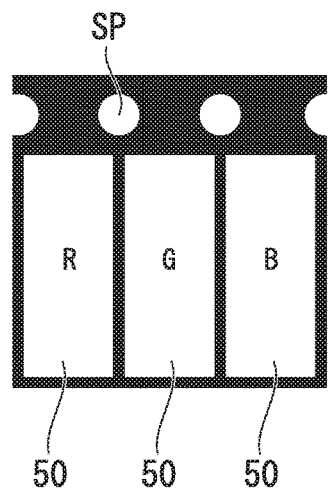
FIG. 16A is a diagram illustrating an arrangement example of one subpixel/one spacer.
Figure 16B:
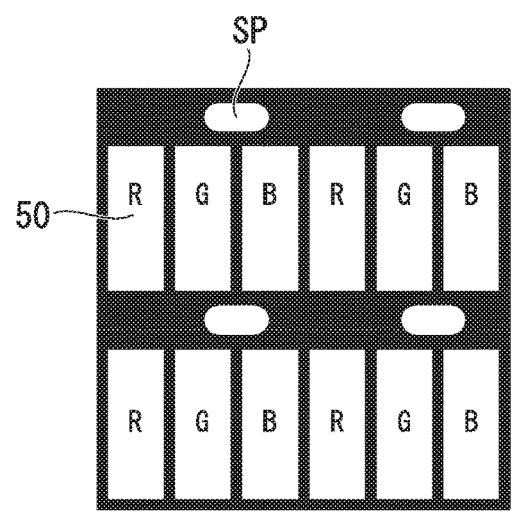
FIG. 16B is a diagram illustrating an arrangement example of three subpixels/one spacer.

In the case of a liquid crystal display device having definition that is not high, one subspacer SP is provided between subpixels 50 as in the configuration illustrated in FIG. 16A. However, in the case of a high-definition liquid crystal display device, one subspacer SP cannot be formed between the subpixels 50 because a distance between adjacent subspacers SP is short. Thus, as in the configuration illustrated in FIG. 16B, a horizontally elongated subspacer SP like a combination of two subspacers SP corresponding to two subpixels 50 is provided. As definition of the liquid crystal display device increases, the subspacer SP overlaps the TFT element on the TFT array substrate 6 side.

Figure 17:
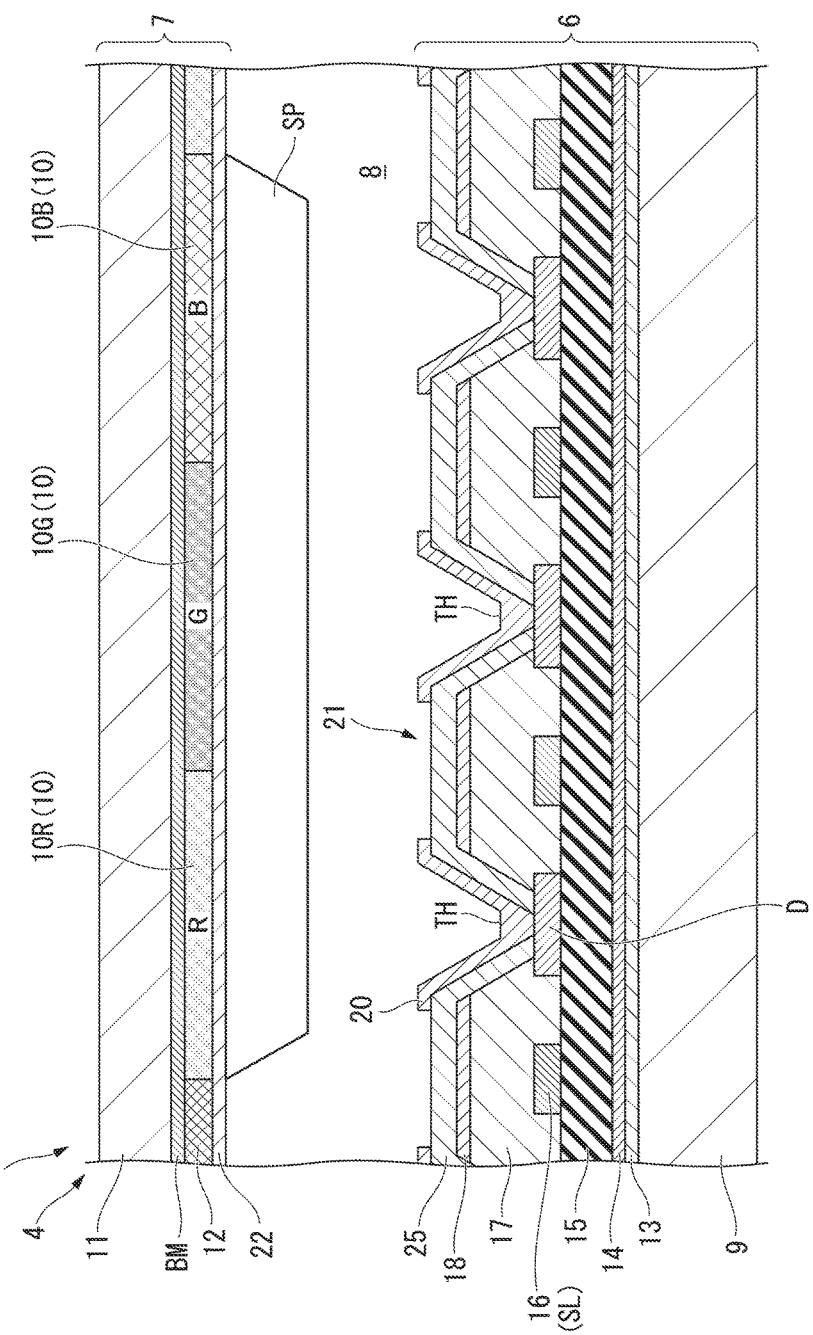
FIG. 17 is a cross-sectional view illustrating the arrangement example of six subpixels/one spacer.

As illustrated in FIG. 17, on the side of the TFT array substrate 6, a contact portion between the TFT 21 and the pixel electrode 20 (hereinafter referred to as the through hole TH) has a recessed concave surface shape. The higher the definition of a model, the larger a ratio of an area of a portion formed by the subspacer SP disposed between the subpixels 50 overlapping the through hole TH. As described above, because the through hole TH has a concave shape, a force for maintaining a liquid crystal cell thickness by the subspacer SP is weak. In order to avoid this, it is necessary to increase a formation area of the subspacer SP.

Figure 16C:
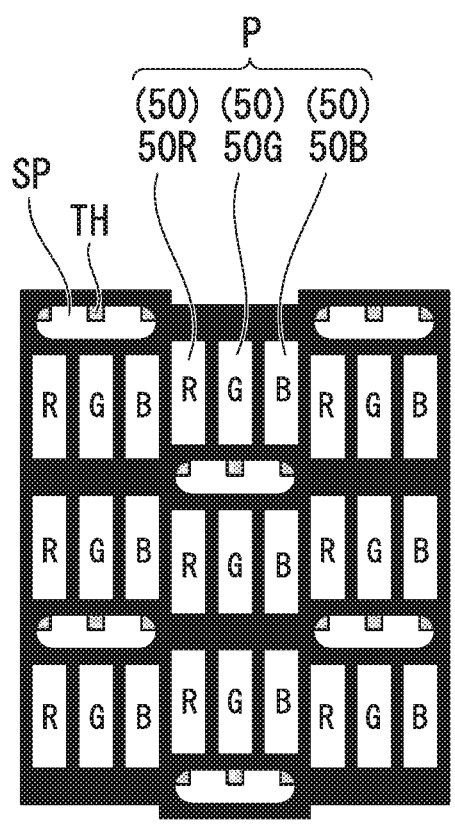
FIG. 16C is a diagram illustrating an arrangement example of six subpixels/one spacer.

As illustrated in FIG. 16C, if one subspacer SP is disposed in six subpixels 50, the subspacer SP has a lateral width extending across three subpixels 50R, 50G, and 50B constituting one pixel P. When the lateral width of the subspacer SP is increased, a foreign object such as dust is caught by the subspacer SP during a cleaning process performed after the formation of the subspacer SP and it is difficult to remove the foreign object. If the foreign object is located on the substrate, an alignment disorder of the liquid crystal may occur and minute luminescent spots may occur.

On the other hand, according to the configuration of the present embodiment, by disposing the subspacers SP at a ratio of one subspacer to four pixels, it is possible to provide a liquid crystal display device such that it becomes difficult for a foreign object to remain during cleaning, and it becomes possible to sufficiently secure the retention strength (pushing pressure strength) of the liquid crystal cell thickness. In the present embodiment, it is possible to reduce an overlapping area between the subspacer SP and the through hole TH even in a high-definition liquid crystal display device.

Also, by setting the shape of the subspacer SP (the length in the row direction V1) to the above-described size, a foreign object is efficiently removed when the cleaning liquid flows in the cleaning process and a foreign object can be prevented from remaining on the substrate. Thereby, in the manufactured liquid crystal display device, an alignment disorder of the liquid crystal due to a foreign object can be minimized and the occurrence of minute luminescent spots can be minimized.

As described above, preferred embodiments according to an aspect of the present invention are described with reference to the drawings, but the present invention is not limited to such an example. It should be obvious that those skilled in the art can conceive of various changed examples or corrected examples in a category described in the Claims, and it should be understood that these changed examples or corrected examples naturally belong to the technical range of the present invention.

In the above embodiment, the subspacer SP1 having an elliptical shape in a plan view is provided, but the shape of the subspacer SP1 in a plan view is not limited to the above shape.

For example, the planar shape of the subspacer SP1 when viewed from the normal direction of the opposing substrate 7 may have a shape of a dimension in which a side surface of an upstream side is shorter than a side surface of a downstream side in a cleaning liquid flow direction.

Figure 14A:
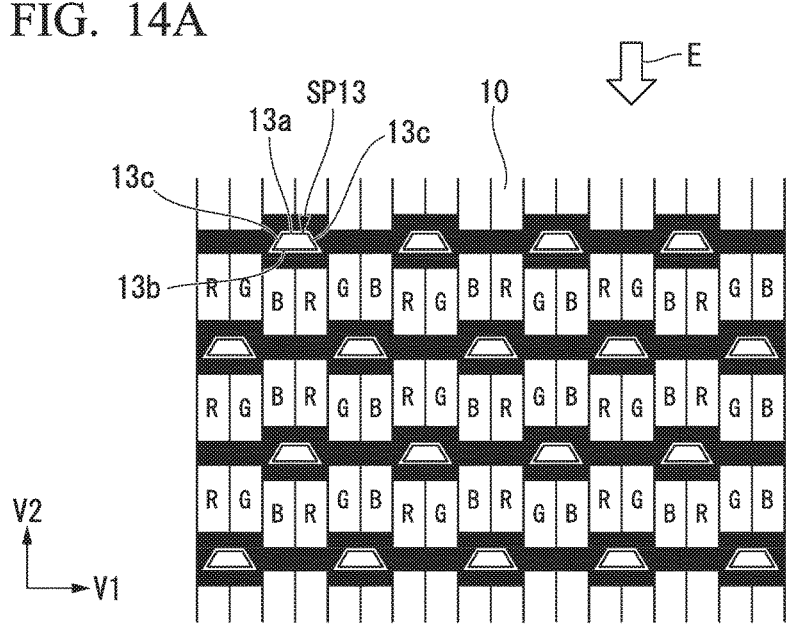
FIG. 14A is a first diagram illustrating an example of a shape of a subspacer.

Specifically, as illustrated in FIG. 14A, a subspacer SP13 having a trapezoidal shape in a plan view may be used. The subspacer SP13 has a shape of a dimension in which a side surface 13a of the upstream side is shorter than a side surface 13b of the downstream side in a direction in which the cleaning liquid flows indicated by an arrow E of FIG. 14A (the column direction V2). Thus, inclined surfaces 13c and 13c connecting the side surface 13a and the side surface 13b are provided on both sides of the subspacer in the extending direction.

Figure 14B:
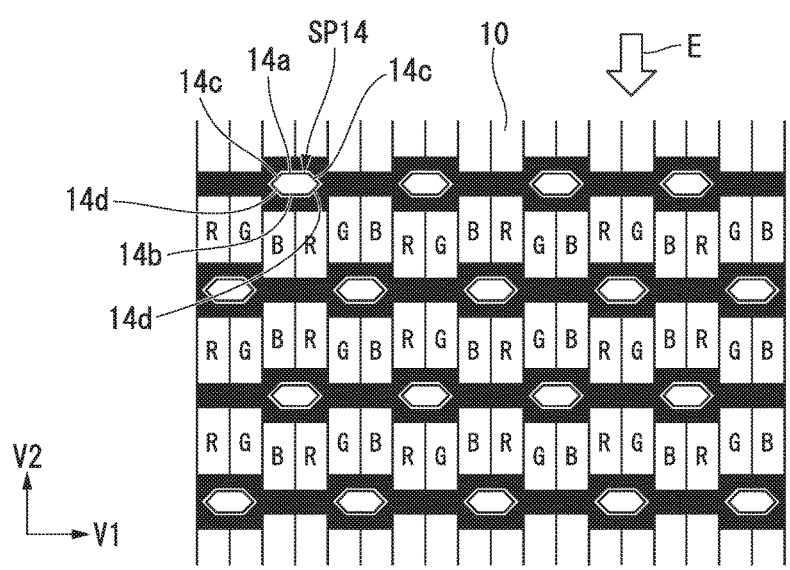
FIG. 14B is a second diagram illustrating an example of a shape of a subspacer.

Alternatively, as illustrated in FIG. 14B, a subspacer SP14 having a polygonal shape in a plan view may be used. The subspacer SP14 has inclined surfaces 14c and 14d inclined at a predetermined angle on both sides in the extending direction with respect to the direction in which the cleaning liquid flows indicated by the arrow E in FIG. 14B (the column direction V2).

By adopting such a shape, it is possible to shorten the side surfaces 13a and 14a on the upstream side in the cleaning direction in the subspacers SP13 and SP14. Thus, because it is difficult for foreign objects to get caught on the subspacers SP13 and SP14, and the foreign objects easily flow downstream, it is possible to improve efficiency of removing foreign objects during cleaning. Also, a curved surface may be provided instead of the inclined surface. In this case, it is preferable to form a curved convex shape protruding toward the upstream side in the cleaning direction.

Also, in a lateral electric field type liquid crystal display device, as in the present embodiment, the common electrode 18 and the pixel electrode 20 are provided on one of a pair of substrates sandwiching the liquid crystal layer 8 (the TFT array substrate 6 in the present embodiment), and an electric field is applied to the liquid crystal layer 8 in a generally lateral direction (generally in a direction parallel to the substrate). In this case, because a director of liquid crystal molecules does not rise in a direction perpendicular to the substrate, there is an advantage of widening an angle of view.

A lateral electric field type liquid crystal display device includes an in-plane switching (IPS) type liquid crystal display device and a fringe field switching (FFS) type liquid crystal display device according to a difference in an electrode configuration. In the lateral electric field type liquid crystal display device, a pixel electrode including a plurality of strip electrodes is formed in a subpixel, and an alignment of the liquid crystal layer is controlled in a direction in which a plurality of strip electrodes are arranged.

Figure 15:
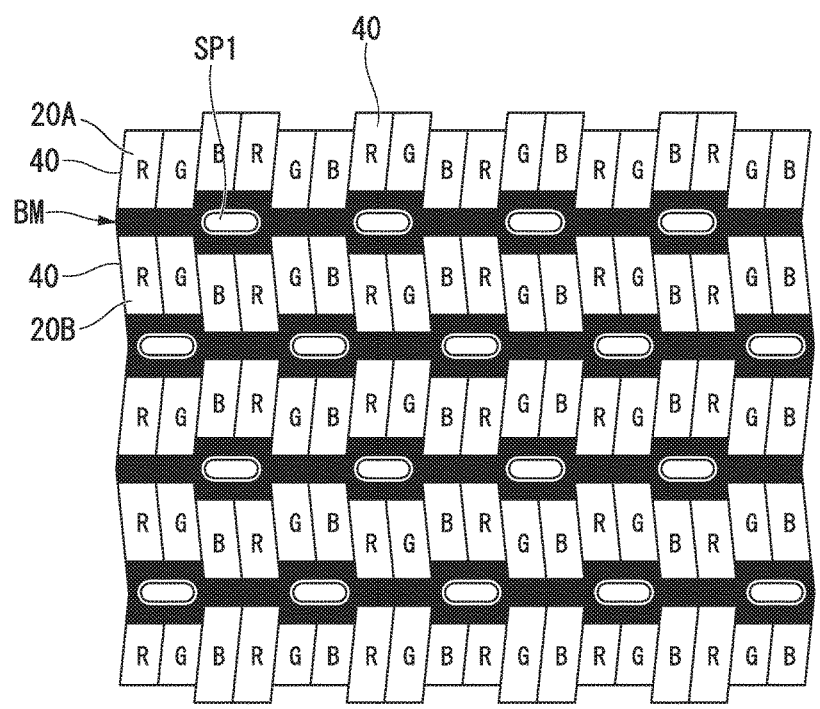
FIG. 15 is a diagram illustrating an example applied to a liquid crystal display device having a multi-domain structure.

The configuration of present embodiment can also be applied to a liquid crystal display device in which pixels are formed in multiple domains to improve an angle of view, as illustrated in FIG. 15. In a liquid crystal display device having a multi-domain structure, a direction of inclination of a pixel electrode 20A and a direction of inclination of a pixel electrode 20B are made to be different between adjacent subpixels 40 in the column direction V2. By adopting the configuration of the present embodiment for such a multi-domain liquid crystal display device, it is possible to improve foreign object removal efficiency during cleaning while securing a retention strength of a cell thickness.

If the main spacer has the same shape as the subspacer and any one of the plurality of subspacers illustrated in FIGS. 6A to 15 is used as the main spacer, a description thereof is the same as the description of the above-described subspaces.

INDUSTRIAL APPLICABILITY

An aspect of the present invention can be applied to a liquid crystal display device or the like such that it becomes difficult for a foreign object to remain during cleaning and it becomes possible to sufficiently secure the retention strength of a liquid crystal cell thickness.

DESCRIPTION OF THE REFERENCE SYMBOLS

1 . . . Liquid crystal display device
6 . . . TFT array substrate (element substrate)
7 . . . Opposing substrate
8 . . . Liquid crystal layer
9, 11 . . . Substrate
G . . . Foreign object
P . . . Pixel
10 (10R, 10G, 10B) . . . Subpixel
13a, 13b . . . Side surface
13c, 14c . . . Inclined surface
23 . . . Enlarged portion (first region)
24 . . . Reduced portion (second region)
BM . . . BM Black matrix
L1, L2 . . . Length
SP1 (SP11, SP12, SP13, SP14) . . . Subspacer
S12 . . . Main spacer
V1 . . . Row direction
V2 . . . Column direction
W1 . . . Lateral width
W2 . . . Longitudinal width

The invention claimed is:
1. A liquid crystal display device comprising:
an element substrate;
an opposing substrate opposite the element substrate;
a liquid crystal layer sandwiched between the element substrate and the opposing substrate;

a plurality of first and second spacers disposed between the element substrate and the opposing substrate; and a black matrix provided on a surface of the opposing substrate, the surface being opposite the element substrate, the black matrix having first portions and second portions, each of the first portions extending in a row direction to separate a plurality of first subpixels arranged in a column direction, each of the second portions extending in the column direction to separate a plurality of second subpixels arranged in the row direction, wherein each of the first portions is formed by alternately disposing one of first regions and one of second regions, each of the second regions having a narrower area than each of the first regions, each of the first regions being formed, in the row direction, every two subpixels of the plurality of second subpixels, one of the plurality of first and second spacers is respectively disposed each of the first regions, and any of the plurality of first spacers arranged in odd-numbered rows and any of the plurality of second spacers arranged in even-numbered rows do not adjoin each other in the column direction.

2. The liquid crystal display device according to claim 1, wherein the plurality of second spacers comprise:

main spacers in contact with both the element substrate and the opposing substrate; and subspacers in contact with either of the element substrate and the opposing substrate.

3. The liquid crystal display device according to claim 2, wherein the subspacers have a lower height than the main spacers and are provided on the surface so that the liquid crystal layer is located between the subspacers and the element substrate.

4. The liquid crystal display device according to claim 2, wherein each of the main spacers is disposed between a blue subpixel and a red subpixel of the plurality of first subpixels, the blue subpixel having low visibility.

5. The liquid crystal display device according to claim 2, wherein the first portions further have third regions having a wider area than the first regions, the subspacers are disposed in the first regions, and the main spacers are disposed in the third regions.

6. The liquid crystal display device according to claim 1, wherein a first dimension in the row direction of each of the plurality of first and second spacers is less than or equal to a sum of a second dimension corresponding to two of the plurality of second subpixels and a second dimension of one of the second portions in the row direction.

7. The liquid crystal display device according to claim 1, wherein a first dimension of each of a plurality of third spacers in the column direction is less than or equal to a second dimension of each of the second in the column direction.

8. The liquid crystal display device according to claim 1, wherein each of the plurality of first spacers is provided at a center of the each of the first regions, and each of the first regions is located around each of the plurality of first and second spacers.

9. The liquid crystal display device according to claim 1, wherein a planar shape of each of the plurality of first and second spacers viewed from a normal direction of the opposing substrate is any one of an elliptical shape, a trapezoidal shape, a polygonal shape, and a semicircular shape.

10. The liquid crystal display device according to claim 1, wherein the plurality of first and second spacers are shaped to have a first height of a central portion thereof and a second height of a peripheral edge portion thereof that are substantially the same.

11. The liquid crystal display device according to claim 1, wherein a first number of subpixels contacted by each of the first regions is greater than a second number of subpixels contacted by each of the second regions.

12. The liquid crystal display device according to claim 11, wherein the first number is eight, and
the second number is four.

* * * * *